United States Patent [19]

Kostka

[11] 4,273,560
[45] Jun. 16, 1981

[54] METHOD FOR OPERATING COMBUSTION DEVICES

[75] Inventor: Hana Kostka, Nuremberg, Fed. Rep. of Germany

[73] Assignee: Siemens Aktiengesellschaft, Berlin and Munich, Fed. Rep. of Germany

[21] Appl. No.: 67,897

[22] Filed: Aug. 20, 1979

[30] Foreign Application Priority Data

Aug. 30, 1978 [DE] Fed. Rep. of Germany ....... 2837899

[51] Int. Cl.³ .................................................. C01B 3/40
[52] U.S. Cl. ......................................... 48/212; 123/3;
252/443; 252/455 R; 431/2; 431/11
[58] Field of Search ............ 48/212; 123/3, DIG. 12;
431/2, 11; 252/443, 455 R; 423/344

[56] References Cited

U.S. PATENT DOCUMENTS

| | | | |
|---|---|---|---|
| 3,900,313 | 8/1975 | Martin | 423/344 |
| 3,944,504 | 3/1976 | Ford et al. | 252/455 R |
| 3,966,644 | 6/1976 | Gustafson | 252/455 R |
| 3,993,459 | 11/1976 | Koch et al. | 48/212 |

Primary Examiner—Peter F. Kratz
Attorney, Agent, or Firm—Kenyon & Kenyon

[57] ABSTRACT

A method for the operation of combustion devices such as burners and internal-combustion engines, in which liquid hydrocarbon such as straight-run gasoline, heating oil and diesel fuel, are mixed with gasification primary air, and the resulting mixture is conducted into a reaction chamber containing metal bodies composed of an Al-Si eutectic with a primary phase of form about 15 to about 35 weight percent of silicon distributed therein, and in which from about 5 to about 30 weight percent of the aluminum is in the form of $\alpha$-$Al_2O_3$, and in which from about 1 to about 10 weight percent of the silicon is in the form of $\beta$-SiC, where the liquid hydrocarbon is partially oxidized at elevated temperatures into a soot-free fuel gas mixture containing carbon monoxide, hydrogen and gaseous hydrocarbons, and the fuel gas mixture is mixed with secondary air and the fuel gas/secondary air mixture is conducted into the combustion device.

11 Claims, 8 Drawing Figures

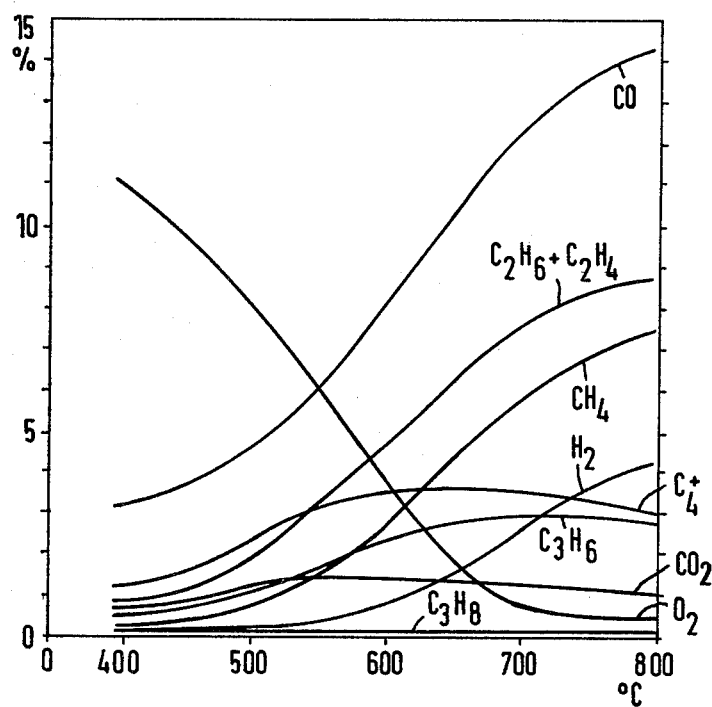
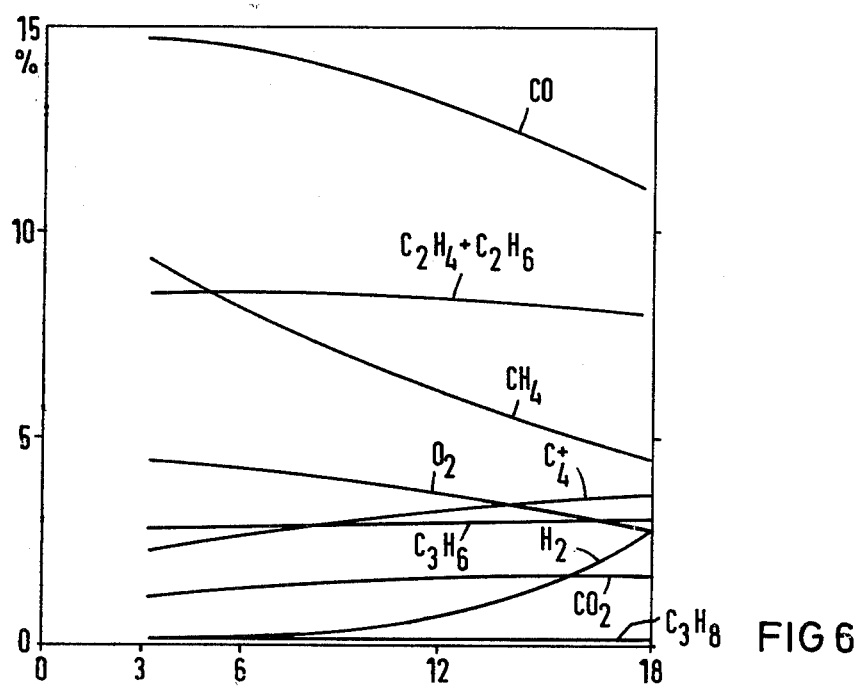
FIG 5
FIG 6

METHOD FOR OPERATING COMBUSTION DEVICES

BACKGROUND OF THE INVENTION

1. Field of Art

The invention relates to a method for the operation of a combustion device, in which liquid hydrocarbons are mixed with primary air and the mixture is conducted into a reaction chamber where it is contacted with shaped metal bodies and subjected to elevated temperature to convert the mixture into a soot-free fuel gas mixture containing carbon monoxide, hydrogen and gaseous hydrocarbons which is mixed with secondary air and fed into the combustion device.

2. Prior Art

In the combustion of liquid fuels in combustion devices such as burners or internal-combustion engines, uneven mixing and combustion of the fuel with the air leads to high emission of harmful substances in the exhaust gas. If these fuels contain lead, or aromatics, these substances which are injurious to health are also contained in the exhaust gas. It is known that the emission of harmful substances can be lowered if the combustion device is preceded by a gas generator in which the fuels are reacted with primary air under heavy air deficiency forming a fuel gas. Such a procedure is described, in detail in U.S. Pat. No. 3,828,736 in which liquid hydrocarbons are gasified, and the resulting gasified hydrocarbons are mixed with air. The resultant hydrocarbon-/air mixture is conducted over nickel sponge or platinum catalyst arranged in the reaction chamber.

Unleaded straight-run gasoline with a low octane number can be used and can also be converted into a fuel gas with a high octane number. Using the procedure of U.S. Pat. No. 3,828,736 the fuel gas so formed can be burned in the internal combustion engine with excess air, in which the formation of nitrogen oxides, and the emission of carbon monoxide and other products of an arrested combustion are largely avoided.

A number of catalytically active fillings for the reaction chamber of reformed-gas generators have also been developed which make possible a soot-free reaction of hydrocarbons with air under heavy air deficiency. These fillings usually consist of a ceramic carrier material which contains a particular aluminum oxide. This aluminum oxide is preferably present in thermally unstable catalytically active modifications since the thermally stable $\alpha$-$Al_2O_3$ only has very little catalytic activity for the partial oxidation. Accordingly, the unstable modification effectively aids the activity of the catalytically active components of the fillings which are usually metal oxides.

It is extremely advantageous to be able to use small amounts of primary air without formation of soot. However, in such situations, known nickel or nickel-containing metal alloys favor the formation of soot. This leads to disturbances in the operation of the combustion device and to contamination of the catalyst which reduces its effectiveness. Also, the catalyst systems described above with ceramic carrier matter cannot suppress soot formation reliably unless the fuel is carefully evaporated before entering the hot reactor. The operation of such known reformed-gas generators requires careful control of the air number since the reaction temperature in the gas generator rises if the amounts of primary air are too large, and the thermally unstable catalysts are damaged. Another disadvantage is that many known catalysts which are used in the prior art processes are sensitive to the use of sulphur-containing fuels. A further disadvantage is that use of the known catalysts required careful control of the process in order to maintain the optimum operating temperature. This is because the known catalysts have relatively low thermal conductivities and, therefore, the danger of uneven temperature distribution and, incomplete conversion in the reaction chamber exists.

It is therefore an object of this invention to provide an improved method for the soot-free conversion of liquid hydrocarbons into a fuel gas which contains carbon-monoxide, hydrogen and gaseous hydrocarbons.

It is another object of this invention to provide an improved method which requires minimum outside control.

It is still another object of this invention to provide an improved method in which sulfur containing hydrocarbons can be used without the possibility of contaminating the environment.

Still other objects and advantages of the present invention will be obvious and apparent to those of skill in the art from the specifications and the appended claims.

SUMMARY OF THE INVENTION

These and other objects which are apparent to those of skill in the art from a consideration of the specification and appended claims are achieved by the method of the present invention. This invention is directed to a method of operating combustion devices which comprises:

mixing liquid hydrocarbons with air;

conducting said hydrocarbons/air mixture to a reaction chamber wherein said mixture is contacted with one or more shaped metal bodies composed of an aluminum alloy which contains from about 15 to about 35 weight percent silicon at elevated temperatures, thereby converting said mixture into a soot-free fuel gas mixture containing carbon monoxide, gaseous hydrocarbons and hydrogen;

mixing said soot-free fuel gas mixture with more air to form a fuel gas/air mixture conducting said fuel gas/air mixture to a combustion device.

In the initial step of the method of this invention, liquid hydrocarbons are mixed with air. This air is hereinafter referred to as "primary air". The amount of primary air used is from about 5 to about 30 percent of the quantity of air required for the stoichiometric combustion of the hydrocarbons in the mixture.

In the second step of the method of this invention, the liquid hydrocarbon/primary air mixture is contacted with one or more shaped metal bodies at an elevated temperature. These bodies are composed of an aluminum alloy which contains silicon. The contacting step converts the mixture into a soot-free fuel gas mixture of carbon monoxide, hydrogen and gaseous hydrocarbon. As used herein gaseous hydrocarbons are those hydrocarbons which are gaseous under normal conditions. Representative of such hydrocarbons are those which include from 3 to 4 carbon atoms per molecule.

The aluminum alloy contains from about 15 to about 35 weight percent silicon. In the preferred embodiments of this invention, the aluminum alloy includes from about 20 to about 25% by weight of silicon. In the preferred embodiment of this invention, metal bodies of Al/Si eutectic are used with a primary phase of silicon distributed therein.

The shaped metal bodies can be comminuted fragments of an AlSi casting. Such AlSi castings are known, as for example as the material of which the housing of reciprocating engines are constructed. These materials are commercially available. The shaped metal bodies can also be made by preparing an alloy powder and molding it into the metal bodies. During the operation of the method of this invention, the shaped metal bodies are subjected at elevated temperatures, preferably at a temperature of between 600° and 800° C., to a stream of gas which contains air (oxygen) and gaseous or gasified hydrocarbons. This procedure which results in the formation of carbon monoxide, carbon dioxide and hydrogen, also results in the catalytic activity of the shaped bodies.

Thus, during the first hours of operation of the method of this invention, a heat treatment of the metal bodies takes place, which leads to structural changes and which leads to the formation of catalytic properties of the shaped bodies. During the first hours of operation it is preferable to choose the air numbers so that during the heat treatment, the ratio of the number of carbon atoms in the hydrocarbon to the number of oxygen molecules in the air is between 2 and 8, and preferably between 4 and 6.5. In this manner, from about 5% to about 30% by weight of the aluminum present in the shaped metal bodies is converted to $\alpha$-$Al_2O_3$, and from about 1% to about 10% of the silicon present in the shaped metal bodies is converted into $\beta$-SiC, during the first hours of operation.

The shaped bodies used in the method of this invention can also be subjected to such a heat treatment before the reactor is placed into operation. For example, they can be treated before they are placed into the reaction chamber. When pre-treated the shaped bodies are subjected for at least about 10 hours to an elevated temperature of between 600° and 800° C. in the presence of an oxidizing atmosphere which leads to the formation of the earlier noted amount of $\alpha$-$Al_2O_3$ and, in the presence of a hydrocarbon-containing atmosphere which leads to the formation of the earlier noted amount $\beta$-SiC. Both steps can be performed simultaneously by treatment for at least about 10 hours in an appropriate gas stream e.g., containing air and hydrocarbon or sequentially, i.e., in separate atmospheres.

These metal bodies exhibit high thermal conductivity. Temperature differences in the reaction chamber are therefore largely and automatically equalized. The bodies are insensitive to temperature fluctuations and exhibit stable catalytic activity after air break-in. While a very slight amount of soot formation can be detected during the first hours of operation, this soot formation is so small that no visible soot is produced and the catalytic activity is not impaired. If sulfur-containing fuels are used, part of the sulfur is absorbed on the metal bodies during the first hours of operation, but the absorbed amount of sulfur does not increase during the extended periods of operation, and does not lead to an impairment of the process. This makes it possible to operate domestic and industrial burners with nondesulfurized heating oils. The use of light as well as the use of heavy heating oil is also possible. It is also possible to operate internal combustion engines, for example a motor vehicle, with straight-run gasoline or diesel oil through use of the method of this invention. By pre-gasifying the fuel according to the invention, the emission of harmful substances of internal-combustion engines can be lowered substantially. Also, when operating domestic burners, the possibility exists that burners which are designed for a higher maximum output can be operated and controlled continuously with low throughputs, if the demand for heat is lower.

An important advantage of the claimed invention is that it is possible to work with small amounts of primary air to convert the liquid hydrocarbon into soot-free fuel gas. For example, air numbers of from about 0.05 to about 0.3 can be used. In the preferred embodiments air numbers of from about 0.09 to 0.1 are used. Using small amounts of air has the advantage of resulting in minimal energy loss during the gasification step. The combustion in the combustion device can likewise take place with relatively small air numbers. The air employed in the combustion step, is hereafter referred to as "secondary air." Thus, the total amount of air in the method according to this invention for both the gasification and combustion steps can be limited to air numbers between 1 and 1.2 which is slightly over stoichiometric. Smaller amounts of air, preferably having air numbers between 1 and 1.07 can also be used in the gasification and combustion steps.

In the case of motor vehicle engines, this means that no unnecessary excess air is driven through the engine as ballast in the combustion mixture yet the leaning-out is still sufficient to prevent emission of unburned harmful substances. In addition, small amounts of air do not cause misfiring or sluggishness if load changes occur. The low air numbers also allow for high combustion temperatures in domestic and industrial burners. The chief advantages are increased heat, and that no appreciable emissions of nitrogen oxides or sulfur oxides are observed at these high temperatures even when sulfur-containing fuels are used.

Through the heat treatment, preferably from 5 to 30% of the aluminum present is converted into $Al_2O_3$, and preferably from 1 to 10% of the silicon present is converted into $\beta$-SiC. A small percentage of the silicon, not detectable in the polished section, is also converted into silicon nitride. Various other components, silicon oxides, aluminum carbides, aluminum silicates, aluminum silicon carbides and sulfur compounds which are formed by heat treatment are also not detectable.

The formation of $Al_2O_3$ and SiC is accompanied by an increase in weight, which can be explained to a certain extent by an initial formation of traces of soot. The quantity of soot can be determined by burning off, however, it is not visible because it is deposited in voids of the material. The soot content is less than about 3% by weight of the total weight of the catalyst. After long periods of operation (more than 2,000 hours) practically no further increase in weight and no further formation of soot could be observed. If sulfur-containing hydrocarbons are used, a certain amount of sulfur absorption analogous to the soot formation is observed. However, sulfur absorption does not cause an impairment of catalytic activity and does not exceed a very low threshold value even over extended periods of operation.

Surprisingly no substantial increases in the activity is achieved by increasing the porosity (surface) of the shaped catalytic bodies. Therefore, to obtain high activity, it is not necessary to increase the surface of catalysts which have been prepared by comminution of a casting by special manufacturing steps beyond the value occurring naturally in the manufacture of the castings. The surface area is normally in the range of 0.03 to 0.2 $m^2/g$.

The high activity of the catalyst according to the invention is highly surprising since known catalysts of $Al_2O_3$ or aluminum silicon ceramics exhibit no appreciable activity and are normally used only as carriers for other catalytically active components.

An AlSi alloy would also be expected to be unsuitable as a catalyst for the above indicated reaction, since the melting point of the eutectic is low and the reaction temperature high and, therefore, this catalyst should be particularly temperature-sensitive. However, contrary to this expectation, it has been observed that the catalyst withstands at least short temperature increases without damage and that high reaction rates can be obtained at temperatures of about 600° to 800° C., while the reaction temperatures for known catalysts are usually at least 50° C. higher.

The catalyst according to the invention is further distinguished from known catalysts by the fact that the $CO_2$- and $H_2O$-content in the product fuel gas can be kept relatively low. This is caused by the fact that the catalyst is particularly rugged with respect to soot formation and requires no measures for preventing soot. This indicates that mainly endothermic processes are being catalyzed. As taught in British Pat. No. 1,517,129, exothermic processes start at lower operating temperatures in the catalytic oxidation of hydrocarbons with air deficiency. These processes lead to a first splitting of the hydrocarbons and have a large amount of reaction heat. At higher reaction temperatures endothermic secondary reactions set in and can be recognized by a decrease in the reaction heat. Upon a further increase of the reaction temperature, endothermic processes set in again which eventually lead to the complete decomposition of the hydrocarbons and to an approximation of the thermodynamic equilibrium (formation of $H_2O$, $CO_2$ and soot). When using the catalyst according to this invention, the endothermic reactions are initiated at low operating temperatures. This causes a particularly effective suppression of soot formation, and low content of $CO_2$ and $H_2O$ are observed. Such oxidation end products as may have been produced can be used up again, in some circumstances. The catalyst is, therefore, also largely insensitive to contact with liquid fuel droplets.

BRIEF DESCRIPTION OF THE DRAWINGS

The preferred embodiments of this invention, and the preferred uses thereof, will be described in greater detail in conjunction with the accompanying diagrammatic representations. It should be understood that the means of carrying out the preferred embodiments exemplified by the figures are not limiting, but rather illustrative and representative of many other embodiments and uses which fall within the spirit of the invention, and that various modifications of the following constructive and operational detail apparent to a person of skill in the art, are within the scope of this invention.

FIG. 5 is a graph of the composition of the fuel gas produced as a function of the reaction temperature.

FIG. 6 is a graph of the composition of the fuel gas produced as a function of the loading of the catalyst.

DESCRIPTION OF THE PREFERRED EMBODIMENTS

Figure 1:
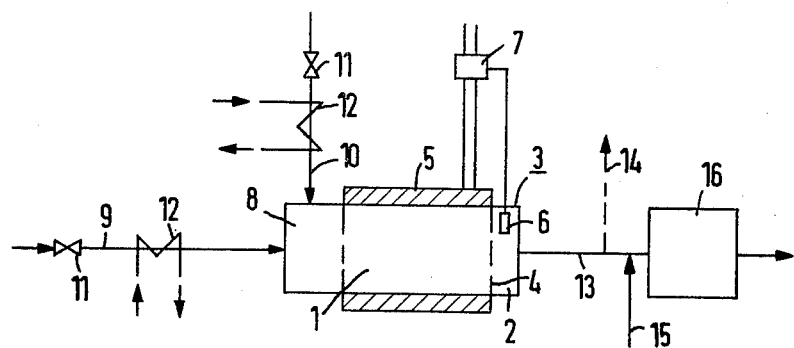
FIG. 1 is a schematic diagram of a device for reacting liquid hydrocarbons with air, and for operating a combustion device with the fuel gas produced.

The metal bodies 1 of the catalyst of this invention for converting the hydrocarbons are arranged in the reaction chamber 2 of a gas generator 3. For example, bodies 1 can be in the form of a bed which is held together by perforated plates 4. The gas generator 3 used here for test purposes, has relatively large and thick walls and a small bed volume and, therefore, has heat losses so high that the reaction temperature necessary for conversion can only be maintained by external heating of the reaction chamber 2. This external heating is provided by heating jacket 5 which in this embodiment is heated electrically by means of a control device 7 which is controlled by a temperature sensor 6 arranged in the reaction chamber 2. The entrance of the reaction chamber 2 is preceded by a mixing chamber 8 into which lead feed lines 9 and 10 for hydrocarbon and air. These feed lines 9 and 10 contain metering valves 11 for adjusting the hydrocarbon throughput and the air numbers. Feed lines 9 and 10 also include heating devices 12, for instance, heat exchangers, for preheating the reaction gases. The fuel gas produced can be taken and analyzed from the outlet line 13 of the gas generator 3 either via a test line 14, or the fuel gas is mixed with combustion air introduced by way of secondary air line 15 and the resultant mixture taken to combustion device 16. In this embodiment, the combustion device serves as a domestic burner. However, it should be appreciated that the combustion device can be an internal combustion engine, for instance, a motor vehicle engine or a gas turbine.

To produce the metal bodies 1, a commercially available casting of an aluminum silicon alloy is broken into fragments of about 5 mm diameter. The starting material designated by the manufacturer as "aluminum silicide" exhibits in the analysis, besides aluminum, 22% by weight of silicon, 0.1% by weight of titanium, 0.1% by weight of vanadium and 0.1% by weight of nickel. Aluminum and silicon are present as a eutectic with a Si primary phase, as far as can be determined by the analysis. For the aluminum, the lattice constant was determined within the error limits as the lattice constant of pure aluminum. Only a very small Si-content is therefore dissolved in the Al phase. Such an alloy is obtained, for instance, by slow cooling of a melt of the two components. The pore volume of the fragments was 0.05 to 0.15 ml/g; pores from a diameter of 8 nm on were included. The mean pore radius was 10 nm and the surface 0.1 m²/g.

From the same starting material, fragments of different Si contents and exhibiting other porosities were produced, for example, by dissolving part of the aluminum from the structure. Also, an alloy powder was made by milling the fragments. The fragments were mixed with 2 weight percent graphite as a plasticizing lubricant and cold pressed in tabletting press at a pressure of 750 kg/cm². Such pellets have a considerably higher porosity but exhibit substantially the same catalytic behavior as the first-mentioned fragments to which the results described in the following refer.

A mixture of heating oil and air is introduced over the first mentioned fragments in the reactor. For a long-term test, heating oil "extra light", density 0.85, C-content 85.7 weight %, was used. However, medium or heavier heating oil having a density of 0.92 or 0.98, and a carbon content of 85.3 and 84.9 weight %, respectively, can also be used. Such medium or heavier heating oil can be used for operating a burner. Also, cracking of unleaded "straight run" gasoline was carried out successfully in the operation of an internal combustion engine connected thereto.

The heating oil was pre-heated to about 415° C., and the air number of the mixture was set to 0.09±0.01. The loading of the reactor charge was 12 liters of heating oil per liter of bed volume and hour.

Figure 2:
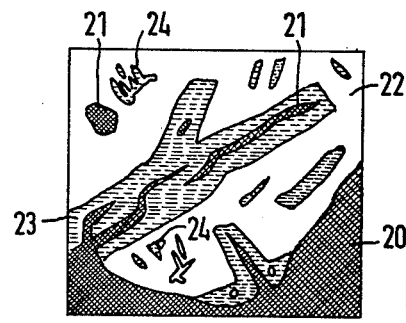
FIG. 2 is a micro-polished section of an Al-Si shaped body perpendicular to the edge of the Al-Si shaped body, before the shaped body is subjected to a hydrocarbon/air gas stream.
Figure 3:
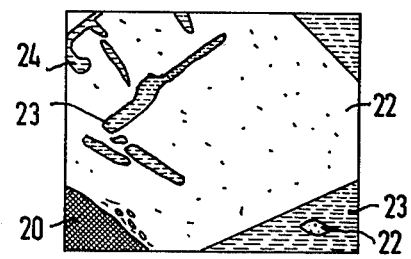
FIG. 3 is an enlarged section of FIG. 2.

Before the reactor was started up for the first time, a sample of the metal bodies was taken and examined by X-rays, analytically and in the micro by means of the microprobe and a light microscope. FIGS. 2 and 3 show the findings of the light microscope.

From FIGS. 2 and 3, it is apparent that in front of the dark background 20, isolated cracks and pores 21 can be seen. The main mass consists of the bright phase 22 of the largely aluminum-containing eutectic. Embedded therein are needle or beam-shaped crystals 23 which are the primary phase of the silicon. FIGS. 2 and 3 also show as an impurity, a light-gray iron phase 24, the composition of which corresponds approximately to the intermetallic body compound $Al_9Fe_2Si_2$ and which also contains small amounts of Mn and Ni. The Mn and Ni impurities, were also determined analytically in extremely small amounts in the other zones of the material.

Figure 4:
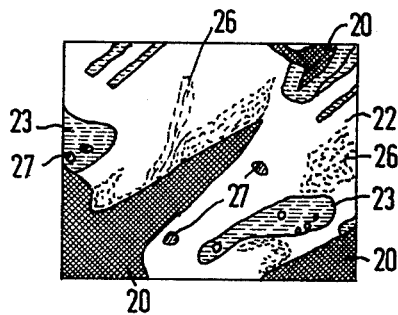
FIG. 4 is an embodiment similar to FIG. 2 after the shaped body was exposed to the hydrocarbon/air gas stream.

After 12 hours in the reactor, another sample of the metal bodies was taken and analyzed in the aforementioned manner, by light microscope. FIG. 4 indicates the findings. FIG. 4 shows a distinctly bright, largely aluminum-containing phase 22, and the embedded, gray Si-phase 23. In addition, very fine-grained zones 26 are observed which contain oxygen. It turns out that this is a very fine-grained $Al_2O_3$ phase with occlusions of different components, mainly aluminum and silicon. Particularly in the outer zones of the particles, medium-gray small precipitates 27 were also observed which were identified as SiC. The catalyst is now formed for long-term operation.

Further investigations after 200 to 2000 operating hours show that with increasing operating periods, during which the activity of the catalyst no longer changes appreciably, the formation of $Al_2O_3$-containing zones is gradually increased. The structure of these zones is very inhomogeneous. The $Al_2O_3$ is partially present in nearly pure alpha-form. Frequently it is permeated by different structure components in extremely fine distribution. Si and SiC containing as well as heavily Al-containing structure components occur. In addition, also the heavily Al-containing eutectic particles are surrounded by a dark-gray $Al_2O_3$-containing layer. In between, there are particles which consist predominantly of Si and contain dark-gray $Al_2O_3$ precipitates as well as medium-gray $\beta$-SiC precipitates. Agglomerations of these precipitates occur particularly in the outer zones of the particles and along the cracks and pores. With increasing operating time, the size of the SiC precipitates seems to grow very slowly. It was further determined that small amounts of sulfur are accumulated in the pores within an oxidic outer zone as well as in the pores in the interior of the particles.

In principle the same results were obtained also when n-heptane and diesel oils were used.

Several times, excess air got into the reaction chamber due to a disturbance in the operation. Although an air break-in is accompanied by temperatures which are considerably above the melting point of the eutectic, it was surprising that for all practical purposes no sintering-together or other changes of the catalyst structure were observed. Only slightly rounded zones due to melting and solidification were found at the surface. Apparently the $Al_2O_3$ and SiC formed give increased structural stability to the metal bodies, like a highly heat-resistant matrix.

In FIG. 5, the gas composition is given as a function of the reaction temperature if heating oil "extra light" is reacted in the reaction chamber with a loading of 12 liters per liter of bed volume per hour and with air numbers around 0.09. The gas contents are given in volume %, based on the gas volume produced (excluding condensable, unreacted hydro-carbon residues). The remainder is nitrogen.

An increasing percentage of the oxygen of the added air is used up in forming carbon monoxide, and the conversion increases with increasing reaction temperature. Only a small amount of $CO_2$ is produced. In addition to hydrogen, methane as well as $C_2$ and $C_3$-containing hydrocarbons are generated. A component designated with $C_4+$ which is not differentiated with respect to its hydrogen content was also generated. It is worthy of note that no generation of acetylene was observed which is unstable at these temperatures and would decompose, forming soot.

In FIG. 6, the gas composition is given as a function of through-put. The reaction temperature was maintained at a constant 750° C. and various catalyst loadings are set. FIG. 6 shows that the rate of conversion decreases with increasing through-put. This can be recognized from the decrease of the CO-content and the increase of non-spent oxygen in the gas mixture produced. In this gas mixture part of the liquid hydrocarbons present is in the form of fuel which is not reacted or only partially reacted, and is merely evaporated, yet it is still suited for most applications at such high catalyst loadings as 18 liter/1. hr.

Figure 7:
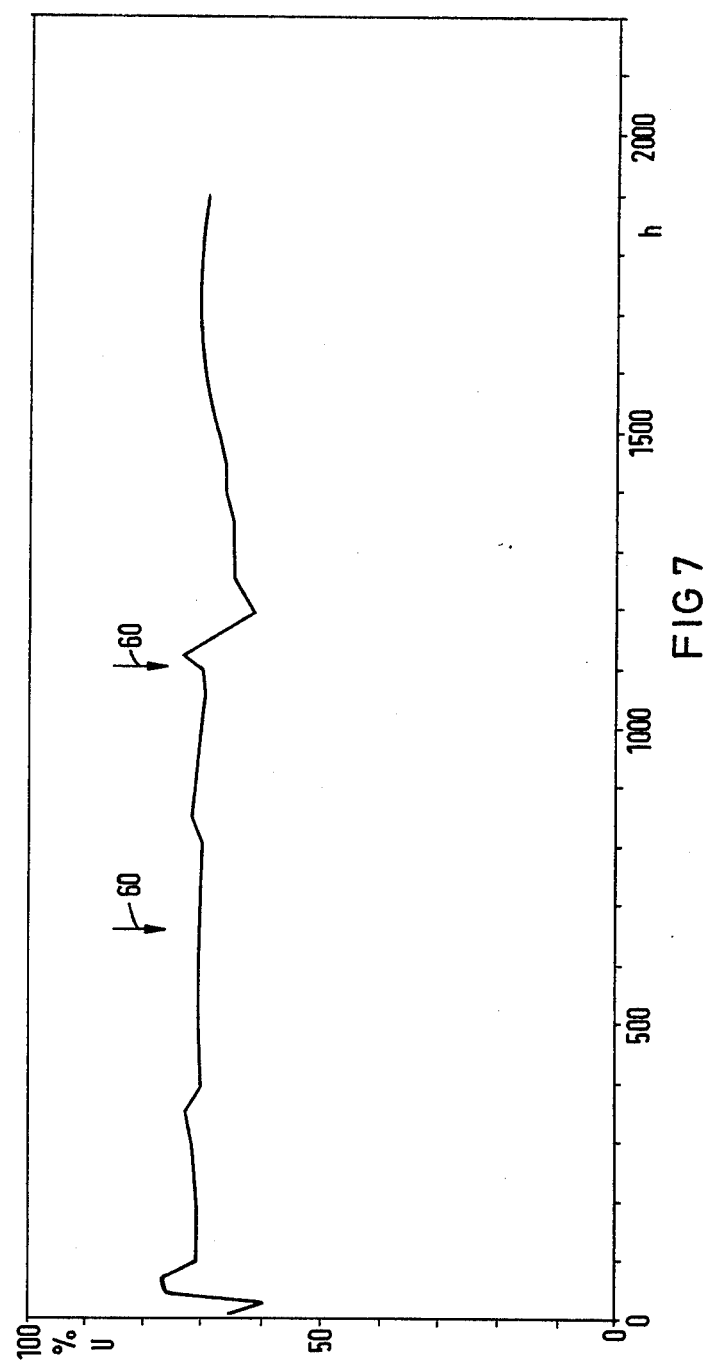
FIG. 7 is a graph showing the conversion obtained as a function of the operating time for long-time operation.

In FIG. 7, the percentage of the liquid fuel which was converted into low molecular weight hydro-carbons, which are gaseous under normal conditions, is shown as a function of the operating hours. The air number was approximately 0.09, the catalyst load 12 1/1 hr. and the catalyst temperature 750° C. First, the untreated metal bodies, not subjected to a hydrocarbon air stream, were put into the reactor. After the first 12 operating hours, the catalyst has been formed into the structure shown in FIG. 4. After initial fluctuations, a conversion degree of about 70% is obtained. The aforementioned air break-ins into the catalyst are designated by the arrows 60. In the first air break-in, the degree of conversion remains practically constant. After the second air break-in, a temporary decrease to about 60% is apparent which, however, is followed by a slow rise to the previous value. These curves contain innumerable on and off switching actions of the installation. For switching off, no particular measures had to be taken to protect the catalyst while it was cooling off slowly, from inflowing air. Starting-up the reaction charge was accomplished by electrically evaporating the heating oil and heating it to a maximum of 415° C. This was accomplished by switching on the external heater of the reactor and additionally pre-heating the evaporating air electrically to 560° C. After at most 8 minutes, it was possible to turn off the heating of the evaporating air, since the heating power of the external reactor heating was sufficient to maintain a stable reaction temperature of 750° C. This relatively long starting time can be shortened for instance, by increasing the air number and carrying out in the reactor more exothermic reactions with correspondingly higher heats of reaction. In order to test the suitability of Al-Si metal bodies for the conversion at small air numbers, such additional measures were dispensed with.

Figure 8:
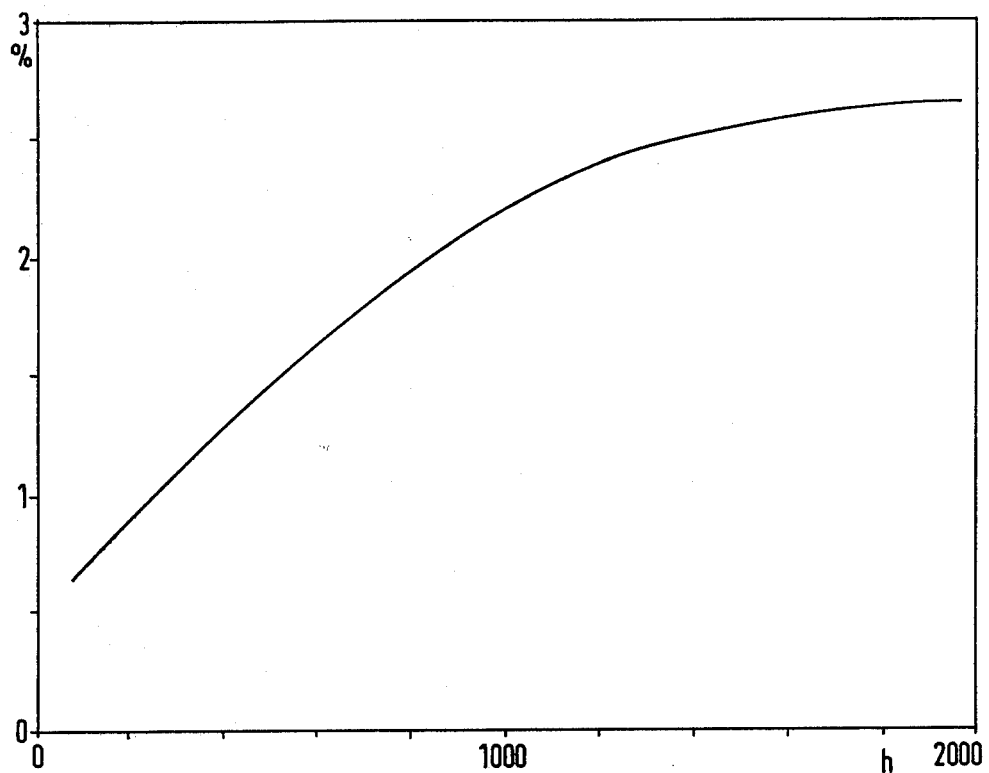
FIG. 8 is a graph showing the deposited quantity of soot as a function of the operating time for long-time operation.

As was already mentioned, the formation of small amounts of soot at the catalyst can be shown. FIG. 8 shows the amount of soot deposited at the catalyst in weight % based on the weight of the metal bodies prior to use. As can be seen from FIG. 8, even after 2000 operating hours, the soot formation was less than 3%. The soot is not visible, but presumably deposited in the pores. Parallel with the soot formation, a slight absorption of sulfur in the pores of the metal bodies was observed. However, neither soot nor sulfur impaired the activity of the catalyst. The catalyst can be used with fuels having a higher sulfur content. No formation of $SO_3$ or other detrimental sulfur oxides occurred either in the fuel gas or in the exhaust gas of the combustion device fed with the fuel gas.

What is claimed is:

1. A method for the operation of a combustion device, comprising:
   (a) mixing liquid hydrocarbons with air with an air number of from about 0.05 to about 0.3 resulting in the mixture with liquid hydrocarbons;
   (b) contacting said mixture with shaped metal bodies, consisting essentially of an aluminum alloy containing from about 15 to about 35% silicon by weight, and at elevated temperature, to result in the production, by partial oxidation, of a soot-free fuel gas mixture containing carbon monoxide, gaseous hydrocarbons and hydrogen wherein after the contacting from about 5 to about 30% by weight, of the aluminum in said shaped metal bodies is in the form of $\alpha$-$Al_2O_3$ and from about 1 to about 10% by weight of the silicon in said shaped metal bodies is in the form of $\beta$-SiC;
   (c) mixing said fuel gas with additional air to form a fuel gas/air mixture; and
   (d) conducting said fuel gas/air mixture to a device for the combustion thereof.

2. The method according to claim 1 wherein said shaped metal bodies consist essentially of an aluminum/silicon eutectic having distributed therein a primary phase of silicon.

3. The method according to claims 1 or 2 wherein said contacting at elevated temperature of step (b) results in the in situ conversion of from about 5 to about 30% by weight, of the aluminum in said shaped metal bodies into $\alpha$-$Al_2O_3$ and the in situ conversion of from about 1 to about 10% by weight of the silicon in said shaped metal bodies into $\beta$-SiC.

4. The method according to claims 1 or 2 wherein said shaped metal bodies, prior to the contacting of step (b), are subjected to a temperature of from about 600° C. to about 800° C. in an oxidizing atmosphere for at least about 10 hours to convert from about 5 to about 30% by weight of the aluminum present in said shaped metal bodies into $\alpha$-$Al_2O_3$.

5. The method according to claims 1 or 2 wherein said shaped metal bodies, prior to the contacting of step (b), are subjected to a temperature of from about 600° C. to about 800° C. for at least about 10 hours in an atmosphere containing gaseous or gasified hydrocarbons to convert from about 1 to about 10% by weight of the silicon present in said shaped metal bodies to $\beta$-SiC.

6. The method according to claims 1 or 2 wherein said shaped metal bodies, prior to the contacting of step (b), are subjected to a temperature of from about 600° C. to about 800° C. for at least about 10 hours in a gaseous atmosphere containing hydrocarbons and air, in a $C:O_2$ ratio of from about 2 to 8, to effect conversion of from about 5 to about 30% by weight of the aluminum in said shaped metal bodies into $\alpha$-$Al_2O_3$ and to effect the conversion of from about 1 to about 10% by weight of the silicon in said shaped metal bodies into $\beta$-SiC.

7. The method according to claim 1 wherein the total of the amount of air utilized in steps (a) and (c) provides an air number of from about 1.0 to about 0.2.

8. The method according to claim 7 wherein said air number is from about 1.0 to about 1.07.

9. The method according to claim 1 wherein said liquid hydrocarbons comprise heating oils, and said device for combustion of said fuel gas/air mixture comprises a burner.

10. The method according to claim 9 wherein said heating oils contain sulphur.

11. The method according to claim 1 wherein said liquid hydrocarbons comprise a member selected from the group consisting of straight-run gasoline and Diesel oil, and said device for combustion of said fuel gas/air mixture comprises an internal combustion engine.

* * * * *

UNITED STATES PATENT AND TRADEMARK OFFICE
CERTIFICATE OF CORRECTION

PATENT NO. : 4,273,560
DATED : June 16, 1981
INVENTOR(S) : Hana Kostka

It is certified that error appears in the above—identified patent and that said Letters Patent is hereby corrected as shown below:

Column 10, line 38, "0.2" should read --1.2--.

Signed and Sealed this

First Day of June 1982

[SEAL]

Attest:

GERALD J. MOSSINGHOFF

Attesting Officer

Commissioner of Patents and Trademarks